United States Patent
Tetsuka

(10) Patent No.: US 9,056,651 B2
(45) Date of Patent: Jun. 16, 2015

(54) BICYCLE CONTROL DEVICE

(75) Inventor: Toshio Tetsuka, Ashiya (JP)

(73) Assignee: Shimano Inc., Osaka (JP)

( * ) Notice: Subject to any disclaimer, the term of this patent is extended or adjusted under 35 U.S.C. 154(b) by 404 days.

(21) Appl. No.: 13/595,729

(22) Filed: Aug. 27, 2012

(65) Prior Publication Data

US 2014/0058578 A1 Feb. 27, 2014

(51) Int. Cl.
| | |
|---|---|
| G05D 1/00 | (2006.01) |
| G05D 3/00 | (2006.01) |
| G06F 7/00 | (2006.01) |
| G06F 17/00 | (2006.01) |
| B62L 3/02 | (2006.01) |
| B62M 25/08 | (2006.01) |
| B62K 23/00 | (2006.01) |

(52) U.S. Cl.
CPC *B62L 3/02* (2013.01); *B62M 25/08* (2013.01); *B62K 23/00* (2013.01)

(58) Field of Classification Search
CPC .......... B62L 3/02; B62K 23/00; B62K 25/08
USPC ........ 701/1; 74/473.13, 473.12, 473.3, 501.6, 74/502.2, 551.8, 491; 200/61.87, 61.88; 267/168
See application file for complete search history.

(56) References Cited

U.S. PATENT DOCUMENTS

| | | | |
|---|---|---|---|
| 6,467,786 B2 * | 10/2002 | Horiuchi | 280/260 |
| 8,286,529 B2 | 10/2012 | Tetsuka | |
| 2007/0137361 A1 | 6/2007 | Fujii | |
| 2008/0210043 A1 | 9/2008 | De Perini | |
| 2010/0186538 A1 | 7/2010 | Tetsuka | |
| 2010/0294068 A1 * | 11/2010 | Fujii et al. | 74/473.13 |
| 2013/0014607 A1 * | 1/2013 | Miki et al. | 74/501.6 |

FOREIGN PATENT DOCUMENTS

| | | |
|---|---|---|
| EP | 1384659 A2 | 1/2004 |
| EP | 1526069 A2 | 4/2005 |
| EP | 1932754 A2 | 10/2007 |

* cited by examiner

*Primary Examiner* — Dalena Tran
*Assistant Examiner* — Jaime Figueroa
(74) *Attorney, Agent, or Firm* — Global IP Counselors

(57) ABSTRACT

A bicycle control device includes a base member, an operating member, a detecting member and a switching member. The operating member is movably mounted relative to the base member along an operating path. The detecting member detects operation of the operating member. The switching member is electrically connected to the detecting member so that the detecting member is switched from a power-off state to a power-on state in response to operation of the operating member.

18 Claims, 13 Drawing Sheets

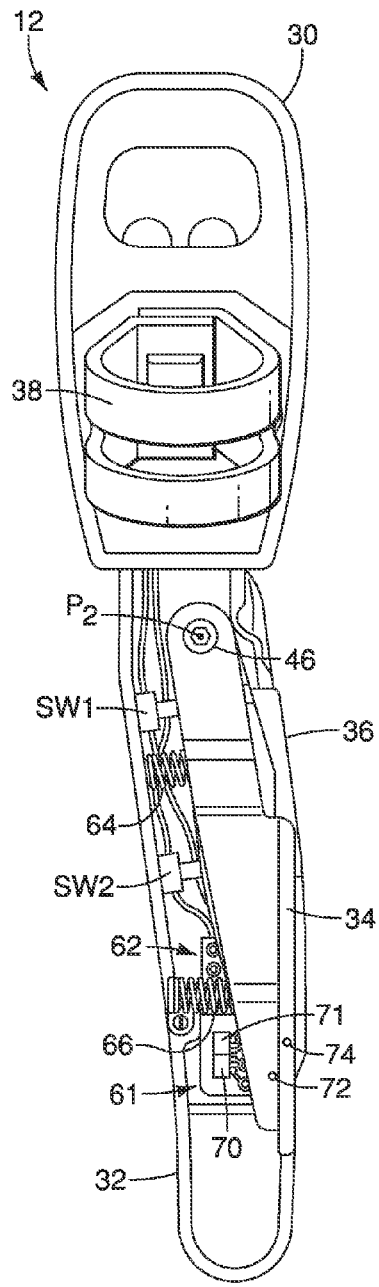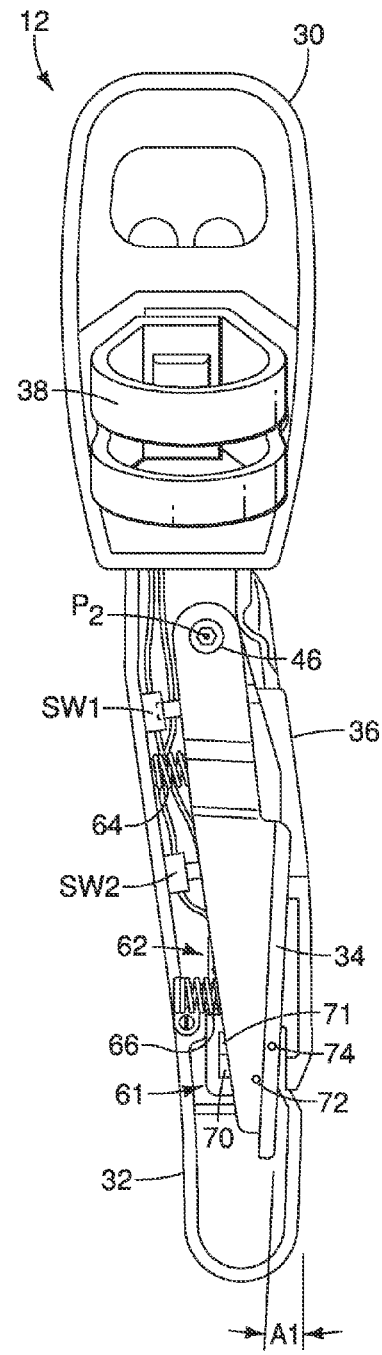
FIG. 5
FIG. 6

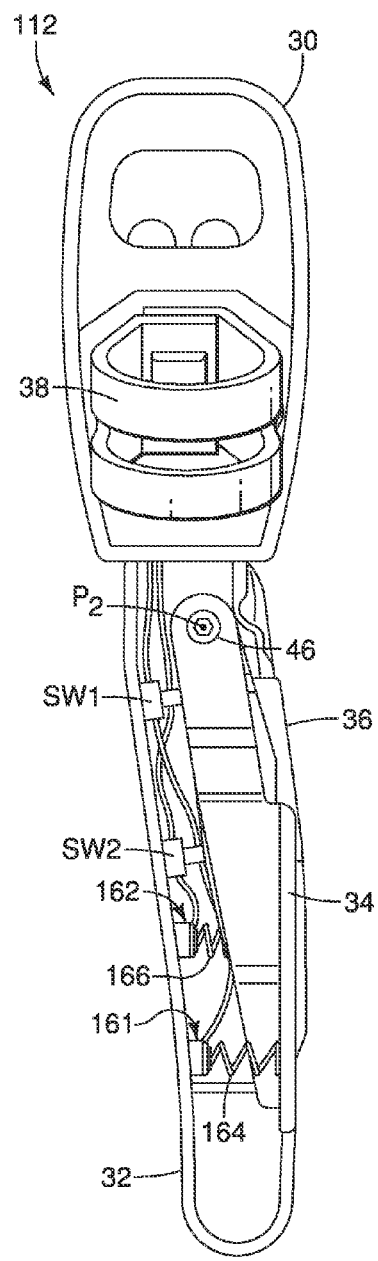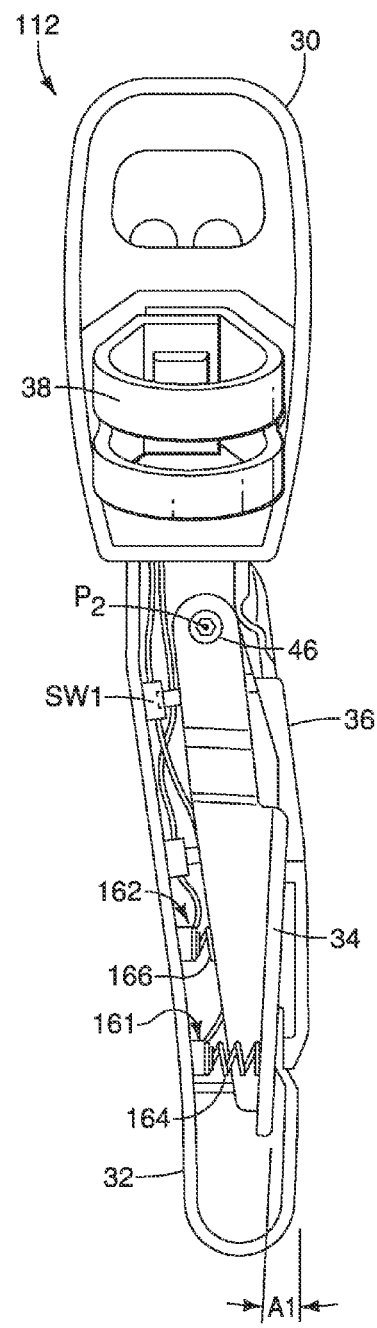
FIG. 13
FIG. 14

BICYCLE CONTROL DEVICE

BACKGROUND

1. Field of the Invention

This invention generally relates to a bicycle control device. More specifically, the present invention relates to a bicycle control device that outputs an electrical control signal for controlling an electrical device.

2. Background Information

Recently, electrical bicycle control devices have been used for operating bicycle shifting device. Three examples of electrical shift control devices are disclosed in U.S. Pat. No. 6,073,730, U.S. Pat. No. 6,129,580 and U.S. Pat. No. 6,216,078 (all assigned to Shimano, Inc.). These patents disclose one or more electrical switches that are coupled to the bracket body. Another example of this type of electrical shift control device is disclosed in U.S. Patent Application Publication No. 2005/0223840 (assigned to Shimano, Inc.). In this publication, an electrical switch is mounted to the brake lever.

SUMMARY

Generally, the present disclosure is directed to various features of a bicycle control device that outputs an electrical control signal for controlling an electrical device. In one feature, a bicycle control device is provided such that electrical power is conserved by maintaining a detecting member that detects operation of the operating member in a power-off state until operation of the operating member.

In view of the state of the known technology, a bicycle control device comprises a base member, an operating member, a detecting member and a switching member. The operating member is movably mounted relative to the base member along an operating path. The detecting member detects operation of the operating member. The switching member is electrically connected to the detecting member so that the detecting member is switched from a power-off state to a power-on state in response to operation of the operating member.

Other objects, features, aspects and advantages of the disclosed bicycle control device will become apparent to those skilled in the art from the following detailed description, which, taken in conjunction with the annexed drawings, discloses preferred embodiments of the bicycle control device.

BRIEF DESCRIPTION OF THE DRAWINGS

Referring now to the attached drawings which form a part of this original disclosure:

FIG. 5 is a rear elevational view of the bicycle control device with the first and second operating members both being located in a rest position (non-operated position) in which switching members associated with the first and second operating members are not depressed (i.e., not operated);

FIG. 6 is a rear elevational view of the bicycle control device with the first operating member moved to a switching position in which the switching member associated with the first operating member is depressed;

FIG. 13 is a rear elevational view of a bicycle control device in accordance with another embodiment that uses force sensors, with the first and second operating members both being located in a rest position in which the switching members associated with the first and second operating members are not depressed;

FIG. 14 is a rear elevational view of the bicycle control device illustrated in FIG. 13, with the first operating member moved to a switching position in which the switching member associated with the first operating member is depressed;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
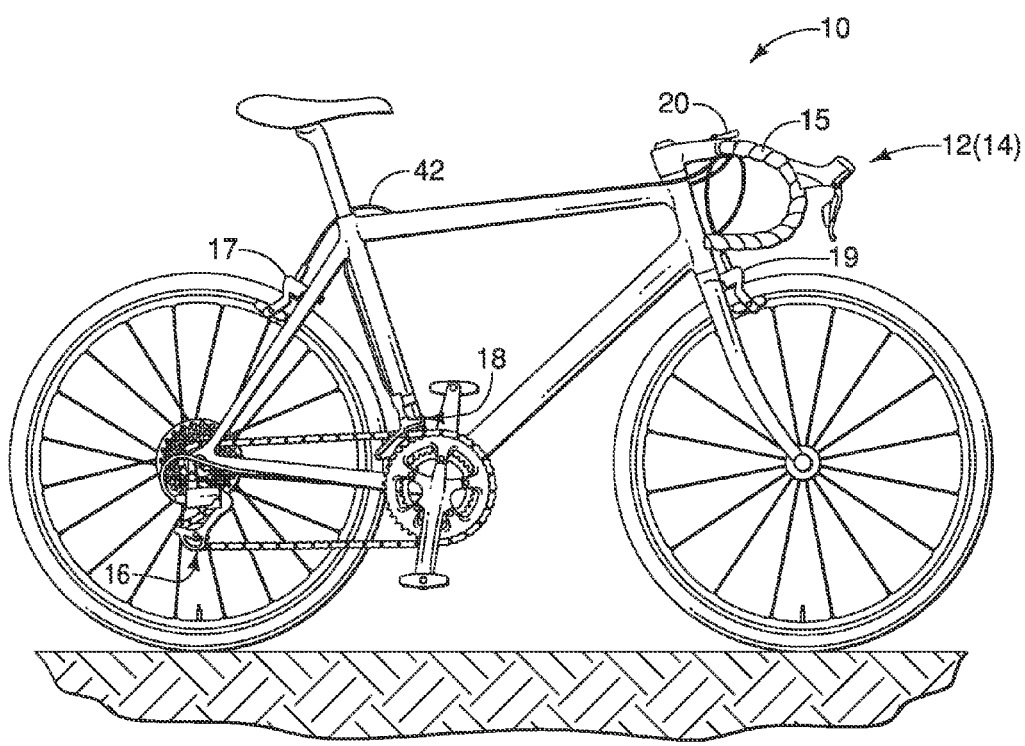
FIG. 1 is a side elevational view of a bicycle equipped with a pair of bicycle control (brake/shift) devices (only one shown) coupled to a drop type handlebar in accordance with a first embodiment.
Figure 2:
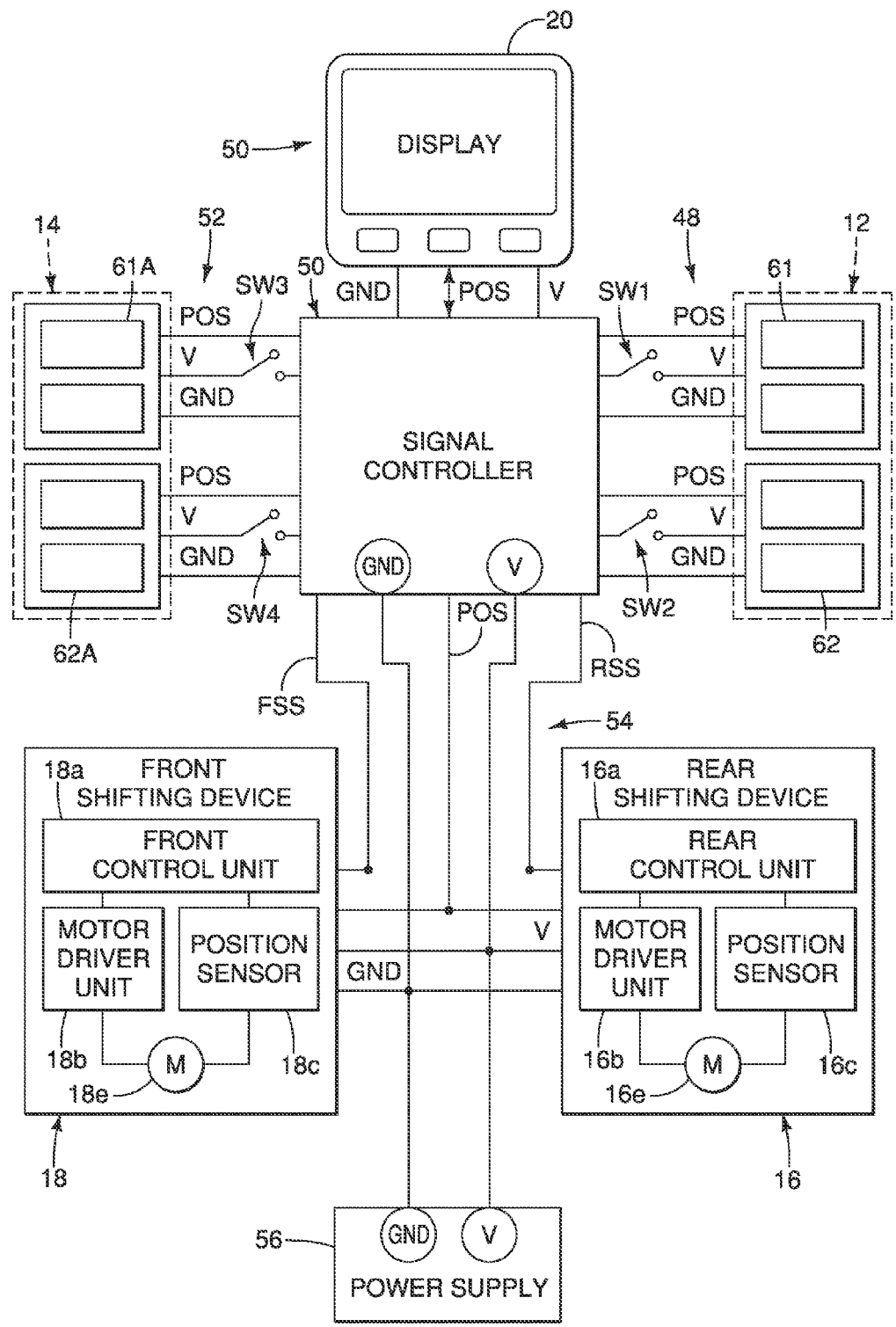
FIG. 2 is a schematic block diagram of the constituent components of a gear change control system that includes the bicycle control devices illustrated in FIG. 1.

Referring initially to FIGS. 1 and 2, a bicycle 10 is illustrated with a pair of bicycle control devices 12 and 14 mounted in a drop type bicycle handlebar 15 (FIG. 1) in accordance with one embodiment. The control device 12 is operatively coupled to an electric rear derailleur 16 and a rear braking device 17, while the control device 14 is operatively coupled to an electric front derailleur 18 and a front braking device 19. The control devices 12 and 14 are identical in construction and operation, except that they are mirror images. Thus, only the control device 12 will be discussed and illustrated in detail herein. Here, in the following description, front and rear, left and right, and up and down signify the front and rear, left and right, and up and down as viewed by the user in a state where the user is seated on a saddle facing the handlebar 15.

Preferably, a cycle computer 20 is operatively coupled between the control devices 12 and 14 and the rear and front derailleurs 16 and 18. Alternatively, the cycle computer 20 can be eliminated such that the control devices 12 and 14 are directly electrically coupled to the rear and front derailleurs 16 and 18. In such a case, each of the control devices 12 and 14 includes its own built in cycle computer for processing signals from control devices 12 and 14.

Figure 3:
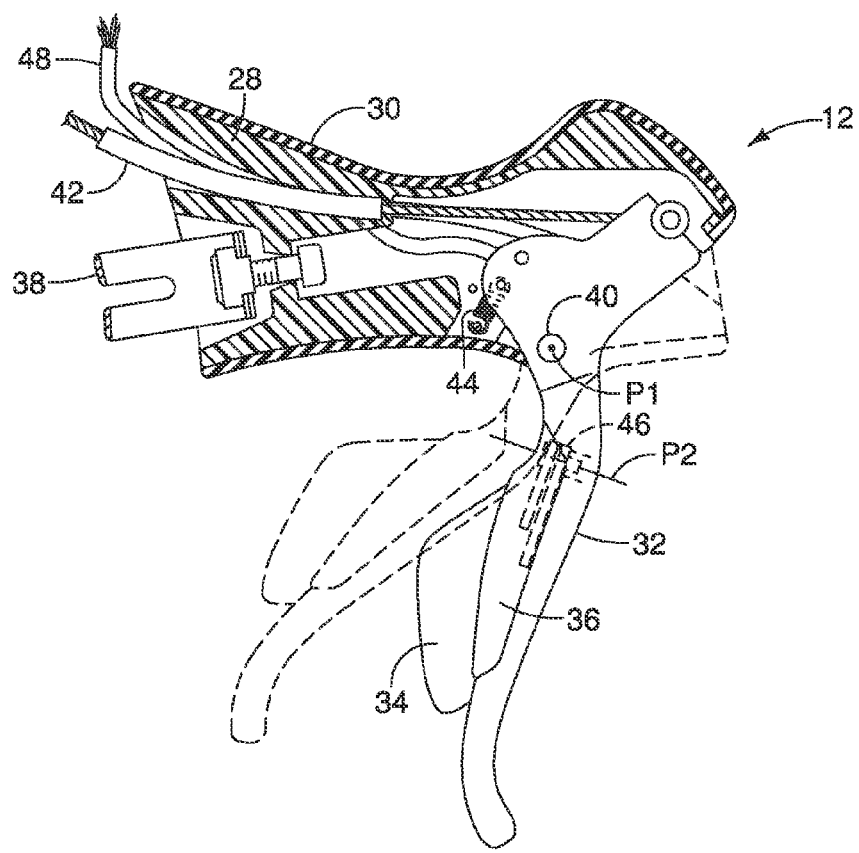
FIG. 3 is a center cross sectional view of the bicycle control device illustrated in FIG. 1.
Figure 4:
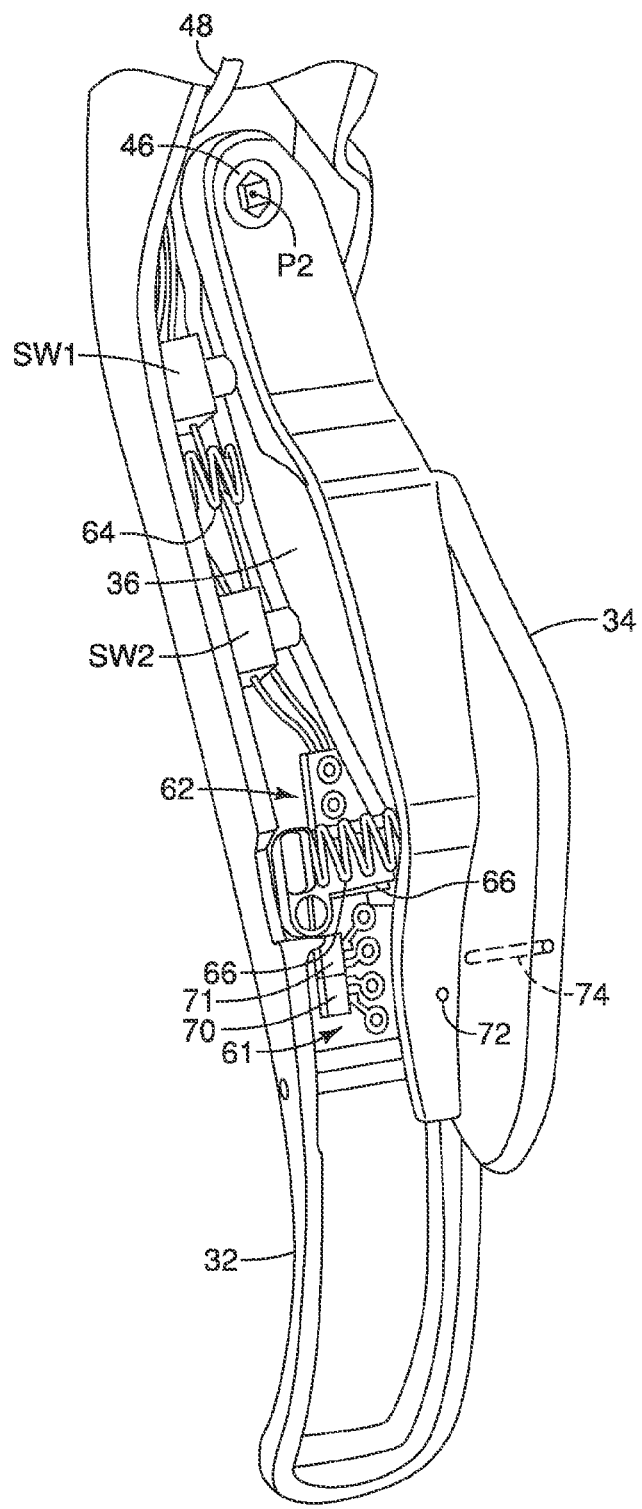
FIG. 4 is an enlarged, partial rear perspective view of the brake lever and first and second operating members of the right bicycle control device illustrated in FIGS. 1 and 2, with two detecting members and two switching members mounted to a rear side of the brake lever.

As best seen in FIGS. 3 and 4, the bicycle control device 12 basically comprises a lever bracket or base member 28, a grip cover 30, a brake lever 32, a first shift operating lever 34 (hereinafter "first operating member 34") and a second shift operating lever 36 (hereinafter "second operating member 36"). The brake lever 32 is pivotally coupled to the base member 28 about a brake operating axis P1 along a brake operating plane to perform a braking operation. The first and second operating members 34 and 36 are pivotally coupled to the brake lever 32 about a pivot axis P2. The brake lever 32 is shown in full lines to illustrate a rest position, and shown in dashed lines to illustrate a braking position. In this embodiment, for example the first operating member 34 corresponds to the operating member of claims, and the second operating member 36 corresponds to the additional operating member of claims.

As seen in FIGS. 3 and 4, the base member 28 is configured as a rider hand grip part that also constitutes a drop handlebar bracket body. Typically, the base member 28 is made of a rigid, hard material such as a hard rigid plastic material. The grip cover 30 is stretched over at least the gripping portion of the base member 28 to provide a cushion to the gripping portion of the base member 28 and to provide an attractive appearance. Typically, the grip cover 30 is made of elastic material such as rubber. The base member 28 is mounted to the drop type handlebar 15 by a conventional tube clamp 38 that is attached to the rear end of the base member 28. The tube clamp 38 constitutes a handlebar mounting structure for mounting to the drop type handlebar 15. The second end of the base member 28 pivotally supports the brake lever 32 by a pivot pin 40.

Preferably, the brake lever 32 is a cable operating brake lever that is pivotally mounted to the base member 28 for performing a bicycle braking operation as illustrated in FIG. 2. In other words, the brake lever 32 is attached to a brake cable 42 (e.g., a Bowden cable as shown) to operate the braking device 17. A return spring 44 is operatively coupled between the brake lever 32 and the base member 28 to bias the brake lever 32 to a rest position. The return spring 44 is preferably a coil tension spring that is elongated when the brake lever 32 is moved from the rest position to the braking position. The term "rest position" as used herein refers to a state in which the part (e.g., the brake lever 32, the first operating member 34 and the second operating member 36) remains stationary without the need of a user holding the part in that state corresponding to the rest position.

As seen in FIGS. 3 and 4, in this embodiment, the first and second operating members 34 and 36 are levers that are pivotally attached to the back side of the brake lever 32 by a fastener 46. In other words, the first and second operating members 34 and 36 are movably mounted relative to the base member 28 along operating paths or planes. In the first illustrated embodiment, the operating paths of the first and second operating members 34 and 36 are perpendicular to the brake operating plane of the brake lever 32. In the first illustrated embodiment, the first and second operating members 34 and 36 are independently operated relative to the brake lever 32. In other words, when the first operating member 34 is pivoted, the second operating member 36 remains in a stationary position (rest position). Likewise, when the second operating member 36 is pivoted, the first operating member 34 remains in a stationary position (rest position). Of course, other configurations of the first and second operating members 34 and 36 are possible with some modifications as will be apparent from this disclosure. For example, as described in another embodiment below, the first and second operating members 34 and 36 could be arranged such that the first and second operating members 34 and 36 move together with respect to the base member 28 and the brake lever 32 as the second operating member 36 is moved, and the second operating member 36 remains stationary as the first operating member 34 is moved with respect to the base member 28 and the brake lever 32. In other words, in this alternative configuration, when the first operating member 34 is operated, only the first operating member 34 pivots with respect to the base member 28 and the brake lever 32. Of course, a construction achieving opposite movements of first and second operating members with respect to this movements can be selected as needed and/or desired.

Each of the first and second operating members 34 and 36 can shift a gear changing device (e.g., the electric derailleurs 16 and 18) of a bicycle transmission by one or two steps (shift positions) depending on its stroke length (i.e., the amount of angular movement). The first and second operating members 34 and 36 can be provided with first and second clicking mechanisms (not shown), respectively, for haptically notifying the rider of the boundary between a one-step shift operation position and a two-step shift operation position for preventing unintentional two-step shift.

As best illustrated in FIG. 2, an electrical cable 48 electrically connects the control device 12 to a signal controller 50. Similarly, the electrical cable 52 electrically connects the control device 14 to the signal controller 50. The electrical cables 48 and 52 each includes at least one power line V, at least one ground line GND, and at least one shift signal line POS. The signal controller 50 is provided for communicating shift input signals from the control devices 12 and 14 to the rear and front derailleurs 16 and 18 (i.e., shifting devices). The signal controller 50 can be merely a junction box that directly transmits the shift input signals from the control devices 12 and 14 to the rear and front derailleurs 16 and 18.

Alternatively, the signal controller 50 can include a microcomputer that provides data to and/or from the rear and front derailleurs 16 and 18 and the cycle computer 20 as shown in FIG. 2. For example, signal lines POS are provided between the signal controller 50 and the rear and front derailleurs 16 and 18 and between the signal controller 50 and the cycle computer 20. In this way, the microcomputer of the signal controller 50 receives and/or transmits data for controlling and or setting up the rear and front derailleurs 16 and 18. Thus, the microcomputer of the signal controller 50 can include various calibrating programs for calibrating the rear and front derailleurs 16 and 18 as well as control programs for manually or automatically shifting the rear and front derailleurs 16 and 18. In other words, in addition to manual shifting with the control devices 12 and 14, the microcomputer of the signal controller 50 can be configured to automatically produce shift signals based on the operating conditions of the bicycle using an automatic shifting program.

As seen in FIG. 2, the electric rear derailleur 16 constitutes a rear shifting device that includes a rear control unit 16a (RD controller), a motor drive unit 16b, a position sensor 16d and a motor 16e. The rear control unit 16a is configured and arranged to control the motor drive unit 16b in response to a shift control signal from the control device 112. The motor 16e is configured and arranged to drive the rear shifting device 16. The motor drive unit 16b is configured and arranged to drive the motor 16e. The position sensor 16d is configured and arranged to sense the gearshift position of the rear derailleur 16.

As seen in FIG. 2, the electric front derailleur 18 constitutes a front shifting device that includes a front control unit 18a (FD controller), a motor drive unit 18b, a position sensor 18d and a motor 18e. The front control unit 18a is configured and arranged to control the motor drive unit 18b in response to a shift control signal from the control device 14. The motor 18e is configured and arranged to drive the front derailleur 18. The motor drive unit 18b is configured and arranged to drive the motor 18e. The position sensor 18d is configured and arranged to sense the gearshift position of the front derailleur 118.

Still referring to FIG. 2, the gearshift position signals POS of the rear and front position sensors 16c and 18c are output to the signal controller 50. In the signal controller 50, these signals are converted into display signals so that the gearshift positions of the rear and front derailleurs 16 and 18 are displayed by the display of the cycle computer 20.

In the first illustrated embodiment, the signal controller 50 has a pair of plug-in type electrical connectors that receives mating electrical connectors of the electrical cables 48 and 52. Preferably, the signal controller 50 also has at least one plug-in type electrical connector that receives one or more electrical connectors of a wiring harness 54. The wiring harness 54 includes a plurality of electrical conductors for electrically connecting the rear and front derailleurs 16 and 18, the cycle computer 20 and an electrical power supply 56. The electrical power supply 56 is a source power such as a generator (e.g., a hub dynamo), and/or a battery which can be located in a portion of a frame tube such as the seat tube of the bicycle 10. The control devices 12 and 14 and the rear and front derailleurs 16 and 18 receive electrical power from the electrical power supply 56 via the signal controller 50.

Referring to FIGS. 2 and 4, in the first illustrated embodiment, the control device 12 is provided with a first detecting member 61 that detects movement of the first operating member 34. The control device 12 is further provided with a second detecting member 62 that detects movement of the second operating member 36. The first and second detecting members 61 and 62 constitute non-contact detecting members or movement detectors that non-physically detect a position of the corresponding one of the first and second operating members 34 and 36. The first detecting member 61 detects operation of the first operating member 34 as the first operating member 34 moves along its operating path relative to the base member 28. The second detecting member 62 detects operation of the operation of the second operating member 36 as the second operating member 36 moves along its operating path relative to the base member 28. Thus, the first and second detecting members 61 and 62 are provided on the rear/back side of the brake lever 32 at locations to be actuated by pivotal movement of the first and second operating members 34 and 36, respectively.

As seen in FIG. 4, in the first illustrated embodiment, the first and second operating members 34 and 36 are trigger type of levers that are biased to their rest positions. In particular, a first return spring 64 is provided between the brake lever 32 and the first operating member 34, while a second return spring 66 is provided between the brake lever 32 and the second operating member 36. The first operating member 34 stops at the rest position by contacting the side wall of the brake lever 32 due to a spring force from the first return spring 64. The second operating member 36 stops at the rest position by contacting the side wall of the brake lever 32 to another spring force from the second return spring 66.

Preferably, a first switching member SW1 is provided in the power line V that transmits electrical power to the first detecting member 61. Likewise, a second switching member SW2 is provided in the power line V that transmits electrical power to the second detecting member 62. In other words, the first switching member SW1 is electrically connected to the first detecting member 61 so that the first detecting member 61 is switched from a power-off state to a power-on state in response to operation of the first operating member 34. Similarly, the second switching member SW2 is electrically connected to the second detecting member 62 so that the second detecting member 62 is switched from a power-off state to a power-on state in response to operation of the second operating member 36. In this embodiment, for example, the first detecting member 61 corresponds to the detecting member of claims, the second detecting member 62 corresponds to the additional detecting member of claims, the first switching member SW1 corresponds to the switching member of claims, and the second switching member SW2 corresponds to the additional switching member of claims.

The first and second switching members SW1 and SW2 are preferably press type contact switches that are normally open (i.e. no power being transmitted therethrough). In other words, the first and second switching members SW1 and SW2 are operated by physical contact by movement of the first and second operating members 34 and 36, respectively. As the first switching member SW1 is pushed by the physical contact with the first operating member 34, the first switching member SW1 output a power-on signal for switching the first detecting member 61 from the power-off state to the power-on state. The first switching member SW1 continuously outputs the power-on signal while the first switching member SW1 is pushed by the physical contact. Likewise, as the second switching member SW2 is pushed by the physical contact with the second operating member 36, the second switching member SW2 output a power-on signal for switching the second detecting member 62 from the power-off state to the power-on state. The second switching member SW2 continuously outputs the power-on signal while the first and second switching member SW2 is pushed by the physical contact. In the first illustrated embodiment, the power-on signals are merely current being supplied directly to the first and second detecting members 61 and 62 from the first and second switching members SW1 and SW2, respectively. However, the power-on signals are not limited to current being supplied directly to the first and second detecting members 61 and 62. For example, the power-on signals could be a command signal such that another switch is turn on to supply power through a different electrical path than via the first and second switching members SW1 and SW2, respectively. In any case, the first and second detecting members 61 and 62 are switched from the power-off state to the power-on state while the corresponding one the first and second switching members SW1 and SW2 outputs the power-on signal. However, other types of switch can be used as needed and/or desired.

Basically, the first and second switching members SW1 and SW2 are provided for the purpose of conserving electrical power. When activated, the first and second detecting members 61 and 62 constantly consume a certain amount of power in order to be ready to detect movement of the first and second operating members 34 and 36. Hence, if power is supplied to the first and second detecting members 61 and 62, then the first and second detecting members 61 and 62 are constantly monitoring the positions of the first and second operating members 34 and 36, respectively, which results in a certain amount of power consumption. On the hand, the first and second switching members SW1 and SW2 do not consume any electrical power while the first and second operating members 34 and 36 are in their rest positions. With the first and second operating members 34 and 36 are in their rest positions, no power is supplied to the first and second detecting members 61 and 62 because the first and second switching members SW1 and SW2 are each in an open state.

As seen in FIG. 2, the control device 14 has the same construction as the control device 12, except that the control device 14 is a mirror image of the control device 12. Thus, the control device 14 is provided with first and second detecting members 61A and 62A, which are identical to the first and second detecting members 61 and 62. Also the control device 14 is provided with third and fourth switching members SW3 and SW4 within the electrical cable 52 for switching the first and second detecting members 61A and 62A from a power-off state to a power-on state in response to operation of corresponding one of the operating members of the control device 14.

Referring back to FIG. 4, in the first illustrated embodiment, the first and second detecting members 61 and 62 are electrically wired to the electric rear derailleur 16 and the cycle computer 20 via the signal controller 50. However, the control device 12 could be provided with a wireless communication unit that wirelessly communicates with the signal controller 50 or directly communicates with the electric rear derailleur 16 and the cycle computer 20 in a wireless manner. In any case, the operation signals from the first and second detecting members 61 and 62, which are indicative of the first and second operating members 34 and 36 being moved from their rest positions to one of their operated positions, are communicated either directly or indirectly to the electric rear derailleur 16.

As seen in FIGS. 5 to 8, the first detecting member 61 is a non-contact type of detector that comprises a pair of magnetic sensors 70 and 71 and a pair of magnets 72 and 74 that form a magnet sensing unit, but of course is not limited to a magnet sensing unit. Optical sensor etc. can be used as non-contact detectors (i.e., non-contact detecting members). The magnetic sensors 70 and 71 are disposed on a printed circuit board that is attached to the rear side of the brake lever 32. The magnetic sensors 70 and 71 are disposed at different radial distance with respect to the pivot axis P2. The magnets 72 and 74 are attached to the first operating member 34 at different radial distance with respect to the pivot axis P2 and at different angular orientations with respect to the pivot axis P2.

Generally speaking, the magnetic sensor 70 and the magnet 72 of the first detecting member 61 are operatively arranged with respect to the first operating member 34 to detect movement of the first operating member 34 with respect to the base member 28 from the rest position to a first detecting position. On the other hand, the magnetic sensor 71 and the magnet 74 of the first detecting member 61 are operatively arranged with respect to the first operating member 34 to detect movement of the first operating member 34 with respect to the base member 28 from the rest position to a second detecting position that is farther from the rest position than the first detecting position. The first detecting member 61 outputs the first and second signals in response to the magnetic sensors 70 and 71 sensing the magnets 72 and 74, respectively, respectively.

In particular, as seen in FIG. 6, as the first operating member 34 is operated (i.e., pivoted by an amount A1) from the rest position to a switching position, the first switching member SW1 is depressed so that the first detecting member 61 is activated (i.e., power supplied to the magnetic sensors 70 and 71 in the illustrated embodiment). In other words, the first switching member SW1 switches the first detecting member 61 from the power-off state to the power-on state as the first operating member 34 reaches the switching position from the rest position along the operating path of the first operating member 34. In the power-on state, electricity passes through the first switching member SW1 to the first detecting member 61 so that the magnetic sensors 70 and 71 operate to sense when the first operating member 34 has reached the first and second detecting positions, respectively.

Figure 7:
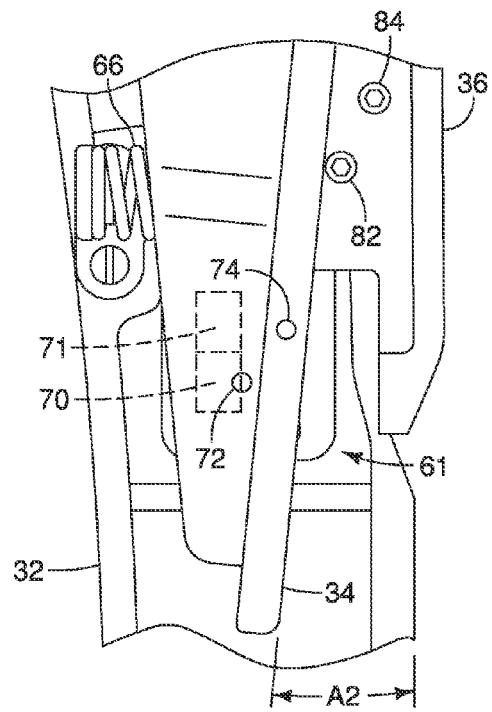
FIG. 7 is an enlarged rear elevational view of a portion of the brake lever illustrated in FIGS. 5 and 6, with the first operating member moved to a first detecting position in which the detecting member associated with the first operating member outputs a first signal.

Then, as seen in FIG. 7, as the first operating member 34 is operated farther (i.e., pivoted by an amount A2 from the rest position) past the switching position, the magnet 72 comes into proximity of the magnetic sensor 70 such that the magnetic sensor 70 outputs a first signal (first shift signal). In other words, the magnetic sensor 70 of the first detecting member 61 non-physically detects the position of the first operating member 34 by detecting the magnet 72 to confirm whether the first operating member 34 has reached the first detecting position that is located further from the rest position than the switching position. Thus, the magnetic sensor 70 and the magnet 72 form a first unit of the first detecting member 61 for generating the first signal.

Figure 8:
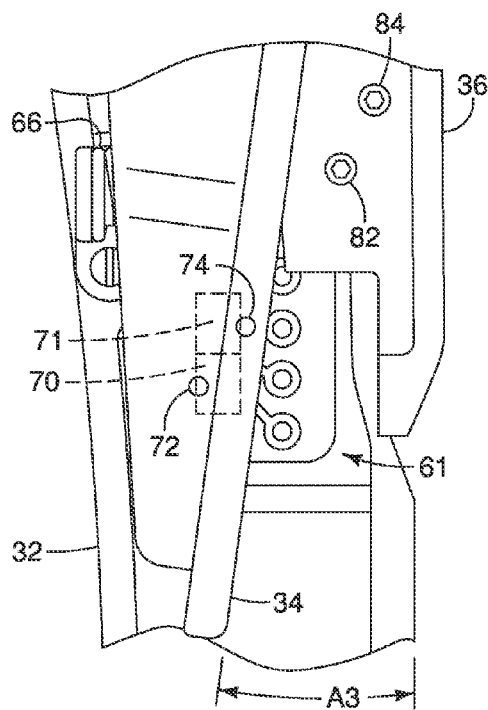
FIG. 8 is an enlarged rear elevational view of a portion of the brake lever illustrated in FIGS. 5 and 6, with the first operating member moved to a second detecting position in which the detecting member associated with the first operating member outputs a second signal.
Figure 9:
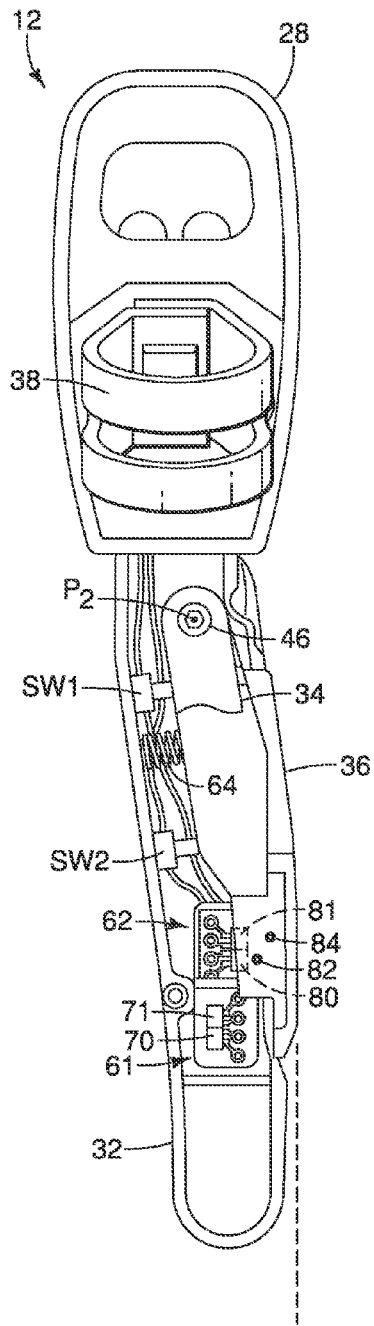
FIG. 9 is a rear elevational view of the bicycle control device illustrated in FIGS. 5 and 6, with a lower portion the first operating member broken away to better illustrate the second operating member, and showing the first and second operating members both being located in a rest position (non-operated position) in which the switching members associated with the first and second operating members are not depressed.

Then, as seen in FIG. 8, as the first operating member 34 is operated even farther (i.e., pivoted by an amount A3 from the rest position) past the first detecting position, the magnet 74 comes into proximity of the magnetic sensor 71 such that the magnetic sensor 71 outputs a second signal (second shift signal). In other words, the magnetic sensor 71 of the first detecting member 61 non-physically detects the position of the first operating member 34 by detecting the magnet 74 to confirm whether the first operating member 34 has reached the second detecting position that is located further from the rest position than the first detecting position. Thus, the magnetic sensor 71 and the magnet 74 form a second unit of the first detecting member 61 for generating a second signal.

Accordingly, the first detecting member 61 outputs the first signal as the first operating member 34 reaches the first detecting position, and then outputs the second signal as the first operating member 34 reaches the second detecting position which is located further from the rest position than the first detecting position. The first signal can be one of an upshift signal to perform an upshift movement in the rear derailleur 16 and a downshift signal to perform a downshift movement in the rear derailleur 16. Also the second signal can be the one of the upshift signal and downshift signal. Alternatively, the first signal can be one of the upshift and downshift signals and the second signal can be the other of the upshift and downshift signals.

As seen in FIGS. 9 to 12, the second detecting member 62 is a non contact type of detector that comprises a pair of magnetic sensors 80 and 81 and a pair of magnets 82 and 84 that form a magnet sensing unit, but of course is not limited to a magnet sensing unit. Optical sensor etc. can be used as non-contact detectors (i.e., non-contact detecting members). The magnetic sensors 80 and 81 are disposed on a printed circuit board that is attached to the rear side of the brake lever 32. The magnetic sensors 80 and 81 are disposed at different radial distance with respect to the pivot axis P2. The magnets 82 and 84 are attached to the second operating member 36 at different radial distance with respect to the pivot axis P2 and at different angular orientations with respect to the pivot axis P2.

Generally speaking, the magnetic sensor 80 and the magnet 82 of the second detecting member 62 are operatively arranged with respect to the second operating member 36 to detect movement of the second operating member 36 with respect to the base member 28 from the rest position to a first detecting position. On the other hand, the magnetic sensor 81 and the magnet 84 of the second detecting member 62 are operatively arranged with respect to the second operating member 36 to detect movement of the second operating member 36 with respect to the base member 28 from the rest position to a second detecting position that is farther from the rest position than the first detecting position. The second detecting member 62 outputs the first and second signals in response to the magnetic sensors 80 and 81 sensing the magnets 82 and 84, respectively.

Figure 10:
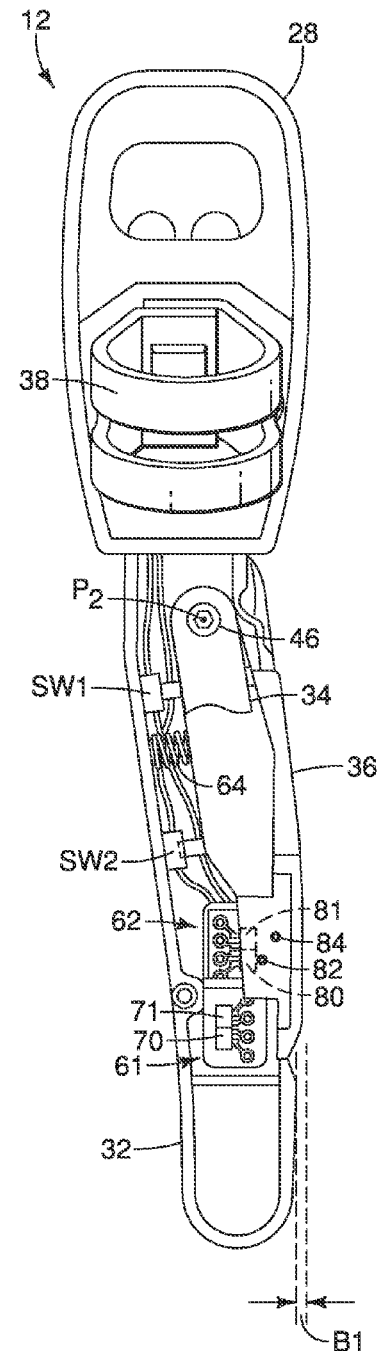
FIG. 10 is a rear elevational view of the bicycle control device illustrated in FIGS. 5, 6 and 9, with a lower portion the first operating member broken away to better illustrate the second operating member, and showing the second operating member moved to a switching position in which the switching member associated with the second operating member is depressed.

In particular, as seen in FIG. 10, as the second operating member 36 is operated (i.e., pivoted by an amount B1) from the rest position to a switching position, the second switching member SW2 is depressed so that the second detecting member 62 is activated (i.e., power supplied to the magnetic sensor 80 in the illustrated embodiment). In other words, the second switching member SW2 switches the second detecting member 62 from the power-off state to the power-on state as the second operating member 36 reaches the switching position from a rest position along the operating path of the second operating member 36.

Figure 11:
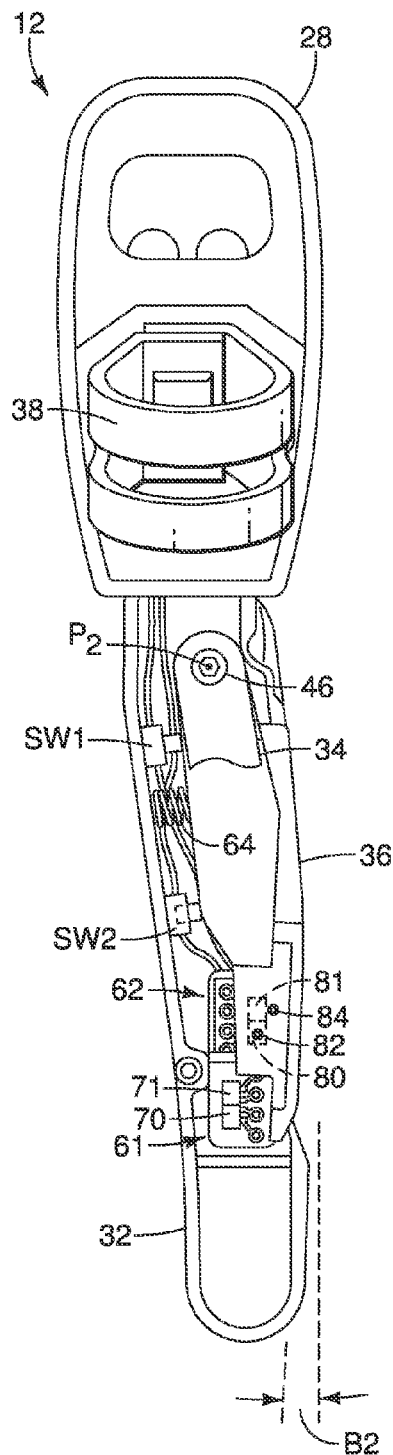
FIG. 11 is a rear elevational view of the bicycle control device illustrated in FIGS. 5, 6, 9 and 10, with a lower portion the first operating member broken away to better illustrate the second operating member, and showing the second operating member moved to a first detecting position in which the detecting member associated with the second operating member outputs a first signal.

Then, as seen in FIG. 11, as the second operating member 36 is operated farther (i.e., pivoted by an amount B2 from the rest position) past the switching position, the magnet 82 comes into proximity of the magnetic sensor 80 such that the magnetic sensor 80 outputs a first signal (first shift signal). In other words, the magnetic sensor 80 of the second detecting member 62 non-physically detects the position of the second operating member 36 by detecting the magnet 82 to confirm whether the second operating member 36 has reached the first detecting position that is located further from the rest position than the switching position. Thus, the magnetic sensor 80 and the magnet 82 form a first unit of the second detecting member 62 for generating the first signal.

Figure 12:
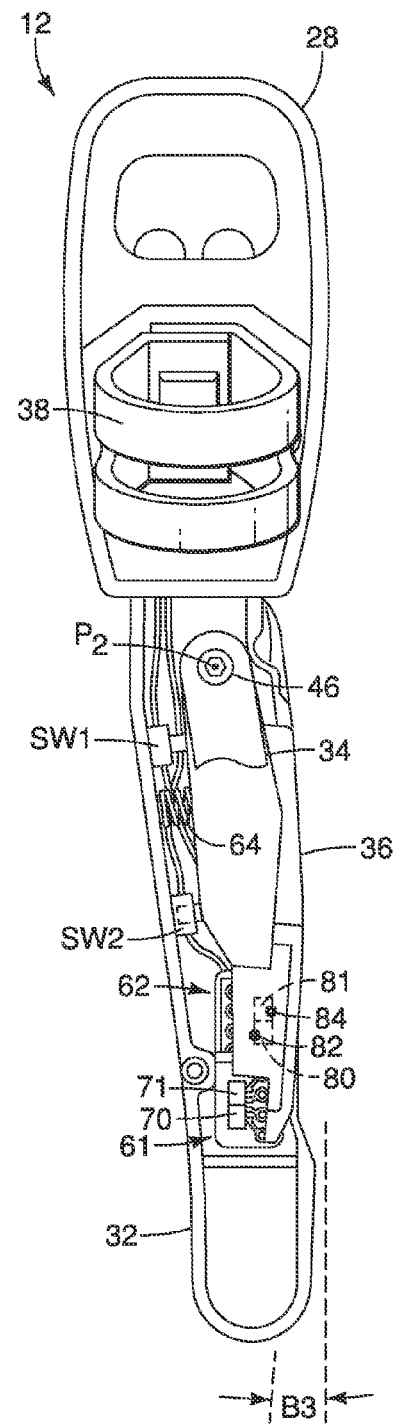
FIG. 12 is a rear elevational view of the bicycle control device illustrated in FIGS. 5, 6 and 9 to 11, with a lower portion the first operating member broken away to better illustrate the second operating member, and showing the second operating member moved to a second detecting position in which the detecting member associated with the second operating member outputs a second signal.

Then, as seen in FIG. 12, as the second operating member 36 is operated even farther (i.e., pivoted by an amount B3 from the rest position) past the second detecting position, the magnet 84 comes into proximity of the magnetic sensor 81 such that the magnetic sensor 81 outputs a second signal (second shift signal). In other words, the magnetic sensor 81 of the second detecting member 62 non-physically detects the position of the second operating member 36 by detecting the magnet 84 to confirm whether the second operating member 36 has reached a second detecting position that is located further from the rest position than the first detecting position. Thus, the magnetic sensor 81 and the magnet 84 form a second unit of the second detecting member 62 for generating a second signal.

Accordingly, the second detecting member 62 outputs the first signal as the second operating member 36 reaches the first detecting position, and then outputs the second signal as the second operating member 36 reaches the second detecting position which is located further from the rest position than the first detecting position. The first signal can be one of an upshift signal to perform an upshift movement in the rear derailleur 16 and a downshift signal to perform a downshift movement in the rear derailleur 16. Also the second signal can be the one of the upshift signal and downshift signal. Alternatively, the first signal can be one of the upshift and downshift signals and the second signal can be the other of the upshift and downshift signals.

Basically, in the first illustrated embodiment, the first operating member 34 is designed to be selectively moved to perform a first shift operation by a first amount of angular movement (i.e., a first stroke) and to perform a second shift operation by a second amount of angular movement (i.e., a second stroke) during a single progressive stroke of the first operating member 34 from the rest position to the second detecting position. Similarly, the second operating member 36 is designed to be selectively moved to perform a first shift operation by a first amount of angular movement (i.e., a first stroke) and to perform a second shift operation by a second amount of angular movement (i.e., a second stroke) during a single progressive stroke of the second operating member 36 from the rest position to the second detecting position. When the first and second operating members 34 and 36 are pivoted, the brake lever 32 is normally stationary. Thus, generally speaking, the first and second operating members 34 and 36 are each movably mounted with respect to the base member 28 to move between the rest position, the switching position, the first detecting position and the second detecting position. The switching position, the first detecting position and the second detecting position are sequentially reached in this order as the first and second operating members 34 and 36 are operated in a single progressive stroke from their rest positions.

Referring now to FIGS. 13 to 20, a bicycle control device 112 will now be discussed in accordance with a second embodiment. Basically, the bicycle control device 112 is identical to the bicycle control device 12, discussed above except that (1) the first and second detecting members 61 and 62 forming the magnet sensing units, respectively, have been replaced with first and second detecting members 161 and 162 being constructed as force sensor respectively (hereinafter "first force sensor 161" and "second force sensor 162"), and (2) the first and second return springs 64 and 66 have been replaced with first and second return springs 164 and 166 that act on the first and second force sensors 161 and 162. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Basically, the first and second three sensors 161 and 162 are operated by a user operating force. In the illustrated embodiment, the first and second force sensors 161 and 162 are mounted on the rear surface of the brake lever 32 so as to be physically operated by the movement of the first and second operating members 34 and 36, respectively. The first force sensor 161 is configured to output at least one control signal based upon an operation force of the first operating member 34 acting on the first three sensor 161. Preferably the first force sensor 161 outputs a first signal upon the operation force of the first operating member 34 reaching a first prescribed force, and outputs a second signal upon the operation force of the first operating member 34 reaching a second prescribed force that is greater than the first prescribed force. Likewise, the second force sensor 162 is configured to output at least one control signal based upon an operation force of the second operating member 36 acting on the second force sensor 162. Preferably, the second force sensor 162 also outputs a first signal upon the operation three of the second operating member 36 reaching a first prescribed force, and outputs a second signal upon the operation force of the second operating member 36 reaching a second prescribed force that is greater than the first prescribed force.

In this second illustrated embodiment, the first force sensor 161 is arranged with respect to the first operating member 34 to receive a compressive force from the first return spring 164 as the operation force of the first operating member 34. The first return spring 164 constitutes a biasing element biases the first operating member 34 towards the rest position. In particular, the first return spring 164 is arranged between the first operating member 34 and the first force sensor 161 to bias the first operating member 34 to a rest position and apply a compressive force to the first force sensor 161 as the operation force of the first operating member 34.

Likewise, the second force sensor 162 is arranged with respect to the second operating member 36 to receive a compressive force from the second return spring 166 as the operation force of the second operating member 36. The second return spring 166 constitutes a biasing element biases the second operating member 36 towards the rest position. In particular, the second return spring 166 is arranged between the second operating member 36 and the second force sensor 162 to bias the second operating member 36 to a rest position and apply a compressive force to the second force sensor 162 as the operation force of the second operating member 36.

Generally speaking, the first force sensor 161 is operatively arranged with respect to the first operating member 34 to detect movement of the first operating member 34 with respect to the base member 28. More specifically, the first force sensor 161 detects movement of the first operating member 34 from the rest position to a first detecting position based on a first compressive force applied to the first force sensor 161 by the first return spring 164, and detects movement of the first operating member 34 from the rest position to a second detecting position based on a second compressive three applied to the first force sensor 161 by the first return spring 164. Similar to the first embodiment, the second detecting position is farther from the rest position than the first detecting position. The first force sensor 161 output the first and second signals, respectively, as one of an upshift signal to perform an upshift movement in a shifting device and a downshift signal to perform a downshift movement in the shifting device.

In particular, as seen in FIG. 14, as the first operating member 34 is operated (i.e., pivoted by an amount A1) from the rest position (FIG. 13) to an switching position, the first switching member SW1 is depressed so that the first force sensor 161 is activated (i.e., receives power in the illustrated embodiment). In other words, the first switching member SW1 switches the first force sensor 161 from the power-off state to the power-on state as the first operating member 34 reaches the switching position from a rest position along the operating path of the first operating member 34.

Figure 15:
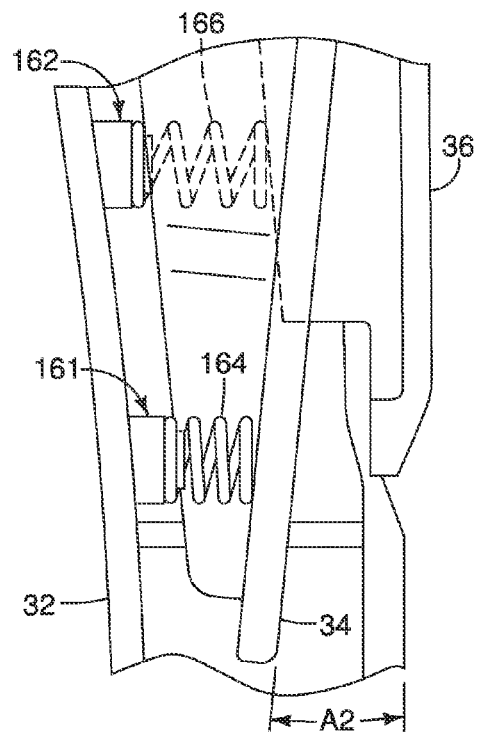
FIG. 15 is an enlarged rear elevational view of a portion of the brake lever illustrated in FIGS. 13 and 14, with the first operating member moved to a first detecting position in which the detecting member associated with the first operating member outputs a first signal.

Then, as seen in FIG. 15, as the first operating member 34 is operated farther (i.e., pivoted by an amount A2 from the rest position) past the switching position, the first return spring 164 applies a first compressive force applied to the first force sensor 161. Upon detecting the first compressive force being applied to the first force sensor 161, a first signal is outputted from the first force sensor 161.

Figure 16:
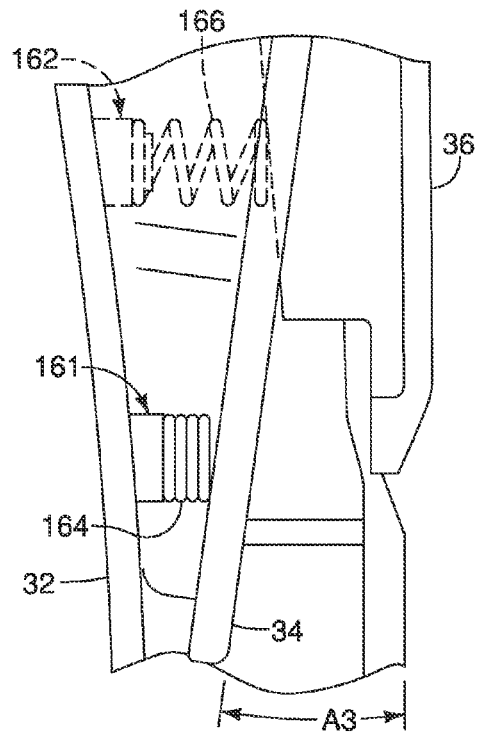
FIG. 16 is an enlarged rear elevational view of a portion of the brake lever illustrated in FIGS. 13 to 15, with the first operating member moved to a second detecting position in which the detecting member associated with the first operating member outputs a second signal.
Figure 17:
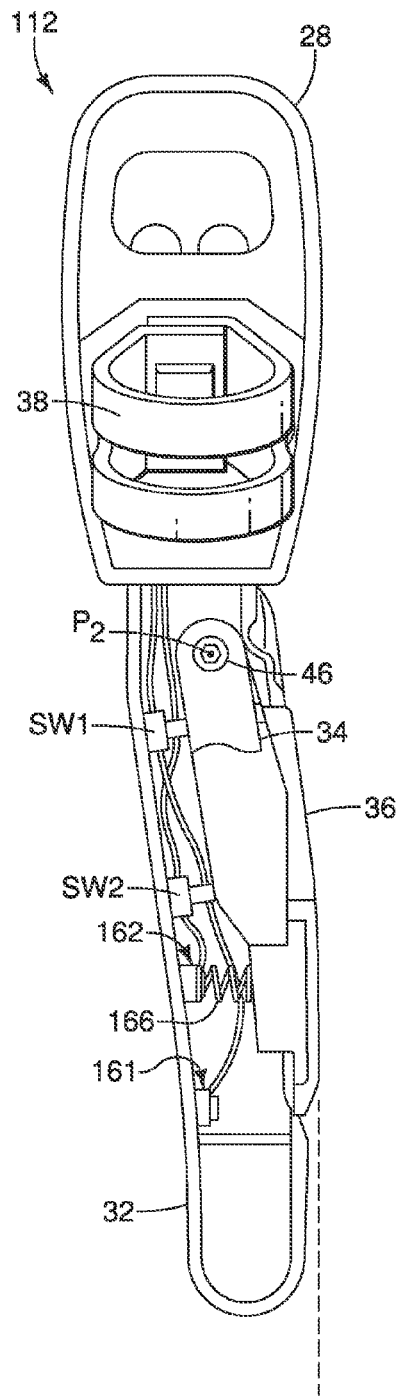
FIG. 17 is a rear elevational view of the bicycle control device illustrated in FIGS. 13 and 14, with a lower portion the first operating member broken away to better illustrate the second operating member, and showing the first and second operating members both being located in a rest position in which the switching members associated with the first and second operating members are not depressed.

Then, as seen in FIG. 16, as the first operating member 34 is operated even farther (i.e., pivoted by an amount A3 from the rest position) past the first detecting position, the first return spring 164 applies a second compressive force applied to the first force sensor 161. Upon detecting the second compressive force being applied to the first force sensor 161, a second signal is outputted from the first force sensor 161. In other words, the first force sensor 161 determines that the compressive force of the first return spring 164 has reached the second prescribed force, which is higher than the first prescribed force corresponding to the first compressive force, to confirm that the first operating member 34 has reached the second detecting position that is located further from the rest position than the first detecting position.

Accordingly, the first force sensor 161 is activated as the first operating member 34 reaches the switching position, outputs the first signal as the first operating member 34 reaches the first detecting position, and then outputs the second signal as the first operating member 34 reaches the second detecting position which is located further from the rest position than the first detecting position. The first signal can be one of an upshift signal to perform an upshift movement in the rear derailleur 16 and a downshift signal to perform a downshift movement in the rear derailleur 16. Also the second signal can be the one of the upshift signal and downshift signal. Alternatively, the first signal can be one of the upshift and downshift signals and the second signal can be the other of the upshift and downshift signals.

Generally speaking, as seen in FIGS. 17 to 20, the second force sensor 162 is operatively arranged with respect to the second operating member 36 to detect movement of the second operating member 36 with respect to the base member 28. More specifically, the second force sensor 162 detects movement of the second operating member 36 from the rest position to a first detecting position based on a first compressive force applied to the second force sensor 162 by the second return spring 166, and detects movement of the second operating member 36 from the rest position to a second detecting position based on a second compressive force applied to the second force sensor 162 by the second return spring 166. Similar to the first embodiment, the second detecting position is farther from the rest position than the first detecting position. The second force sensor 162 output the first and second signals, respectively, as one of an upshift signal to perform an upshift movement in a shifting device and a downshift signal to perform a downshift movement in the shifting device.

Figure 18:
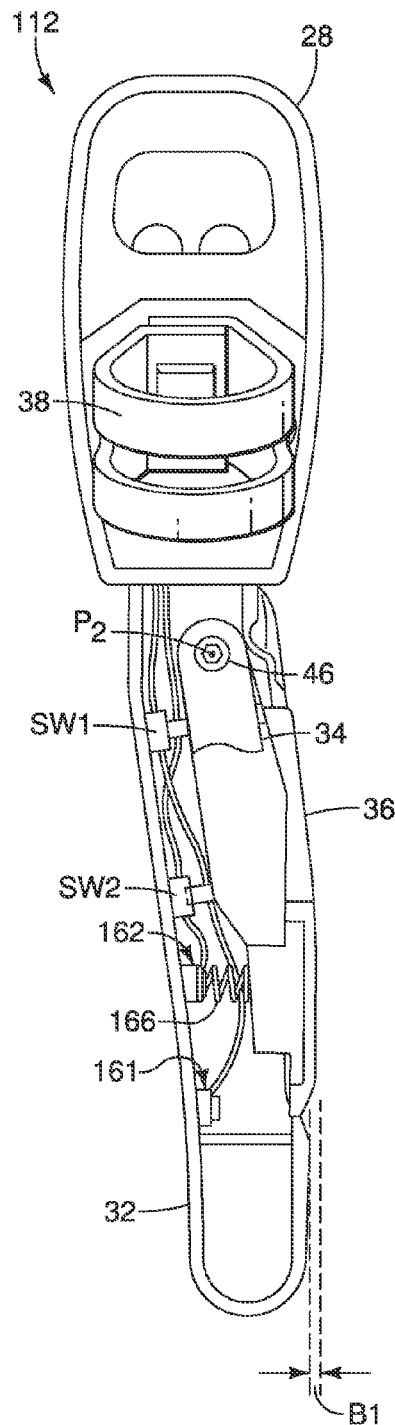
FIG. 18 is a rear elevational view of the bicycle control device illustrated in FIGS. 13, 14 and 17, with a lower portion the first operating member broken away to better illustrate the second operating member, and showing the second operating member moved to a switching position in which the switching member associated with the second operating member is depressed.

In particular, as seen in FIG. 18, as the second operating member 36 is operated (i.e., pivoted by an amount B1) from the rest position (FIG. 17) to an switching position, the second switching member SW2 is depressed so that the second force sensor 162 is activated (i.e., receives power). In other words, the second switching member SW2 switches the second force sensor 162 from the power-off state to the power-on state as the second operating member 36 reaches the switching position from a rest position along the operating path of the second operating member 36.

Figure 19:
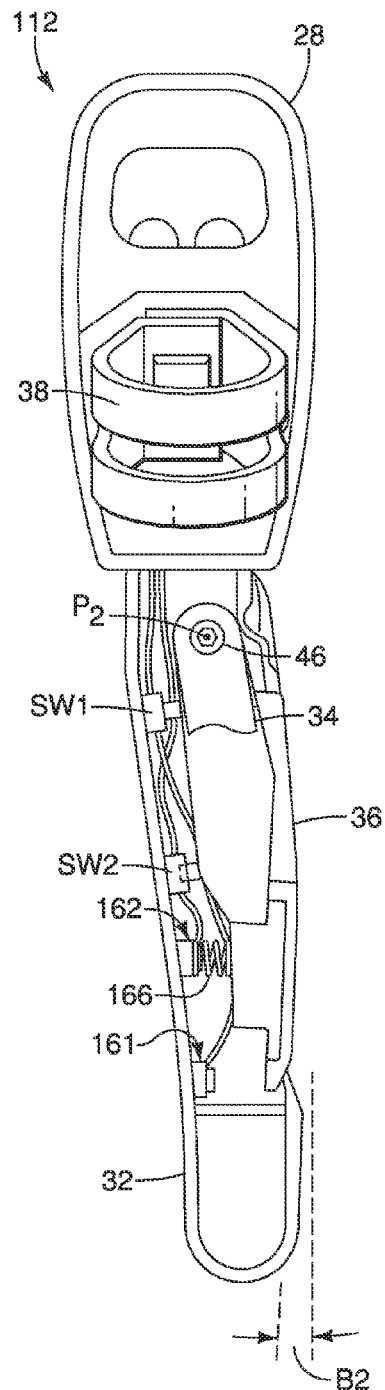
FIG. 19 is a rear elevational view of the bicycle control device illustrated in FIGS. 13, 14, 17 and 18, with a lower portion the first operating member broken away to better illustrate the second operating member, and showing the second operating member moved to a first detecting position in which the detecting member associated with the second operating member outputs a first signal.

Then, as seen in FIG. 19, as the second operating member 36 is operated farther pivoted by an amount B2 from the rest position) past the switching position, the second return spring 166 applies a first compressive force applied to the second force sensor 162. Upon detecting the first compressive force being applied to the second force sensor 162, a first signal is outputted from the second force sensor 162.

Figure 20:
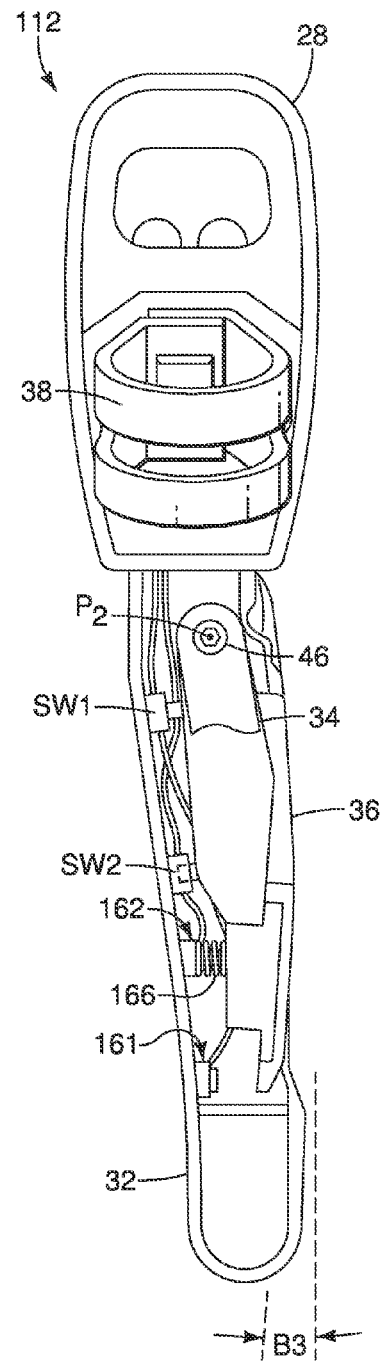
FIG. 20 is a rear elevational view of the bicycle control device illustrated in FIGS. 13, 14 and 17 to 19, with a lower portion the first operating member broken away to better illustrate the second operating member, and showing the second operating member moved to a second detecting position in which the detecting member associated with the second operating member outputs a second signal.

Then, as seen in FIG. 20, as the second operating member 36 is operated even farther (i.e., pivoted by an amount B3 from the rest position) past the first detecting position, the second return spring 166 applies a second compressive force applied to the second force sensor 162. Upon detecting the first compressive force being applied to the second force sensor 162, a second signal is outputted from the second force sensor 162. In other words, the second force sensor 162 determines that the compressive force of the second return spring 166 has reached the second prescribed force, which is higher than the first prescribed force corresponding to the first compressive force, to confirm that the second operating member 36 has reached the second detecting position that is located further from the rest position than the first detecting position for outputting the first signal.

Accordingly, the second force sensor 162 is activated as the second operating member 36 reaches the switching position, outputs the first signal as the second operating member 36 reaches the first detecting position, and then outputs the second signal as the second operating member 36 reaches the second detecting position which is located further from the rest position than the first detecting position. The first signal can be one of an upshift signal to perform an upshift movement in the rear derailleur 16 and a downshift signal to perform a downshift movement in the rear derailleur 16. Also the second signal can be the one of the upshift signal and downshift signal. Alternatively, the first signal can be one of the upshift and downshift signals and the second signal can be the other of the upshift and downshift signals.

Basically, in the second embodiment, each of the first and second operating members 34 and 36 is designed to be selectively moved by a first amount of angular movement (i.e., a first stroke), which compresses the corresponding one of the first and second return springs 164 and 166, which in turn causes the corresponding one of the first and second force sensors 161 and 162 to perform a first shift operation by outputting the first signal, as discussed above. Also each of the first and second operating members 34 and 36 is designed to be selectively moved by a second amount of angular movement (i.e., a second stroke), which compresses the corresponding one of the first and second return springs 164 and 166, which in turn causes the corresponding one of the first and second force sensors 161 and 162 to perform a second shift operation by outputting the second signal, as discussed above. In this way, each of the first and second operating members 34 and 36 performs two successive shift operations during a single progressive stroke from the rest position to the second detecting position.

In the second embodiment, similar to the first embodiment, when the first and second operating members 34 and 36 are pivoted, the brake lever 32 is normally stationary. Thus, generally speaking in the second embodiment, the first and second operating members 34 and 36 are each movably mounted with respect to the base member 28 to move between the rest position, the switching position, the first detecting position and the second detecting position. The first detecting position and the second detecting position are sequentially reached in this order as the first and second operating members 34 and 36 are operated in a single progressive stroke from their rest positions.

Figure 21:
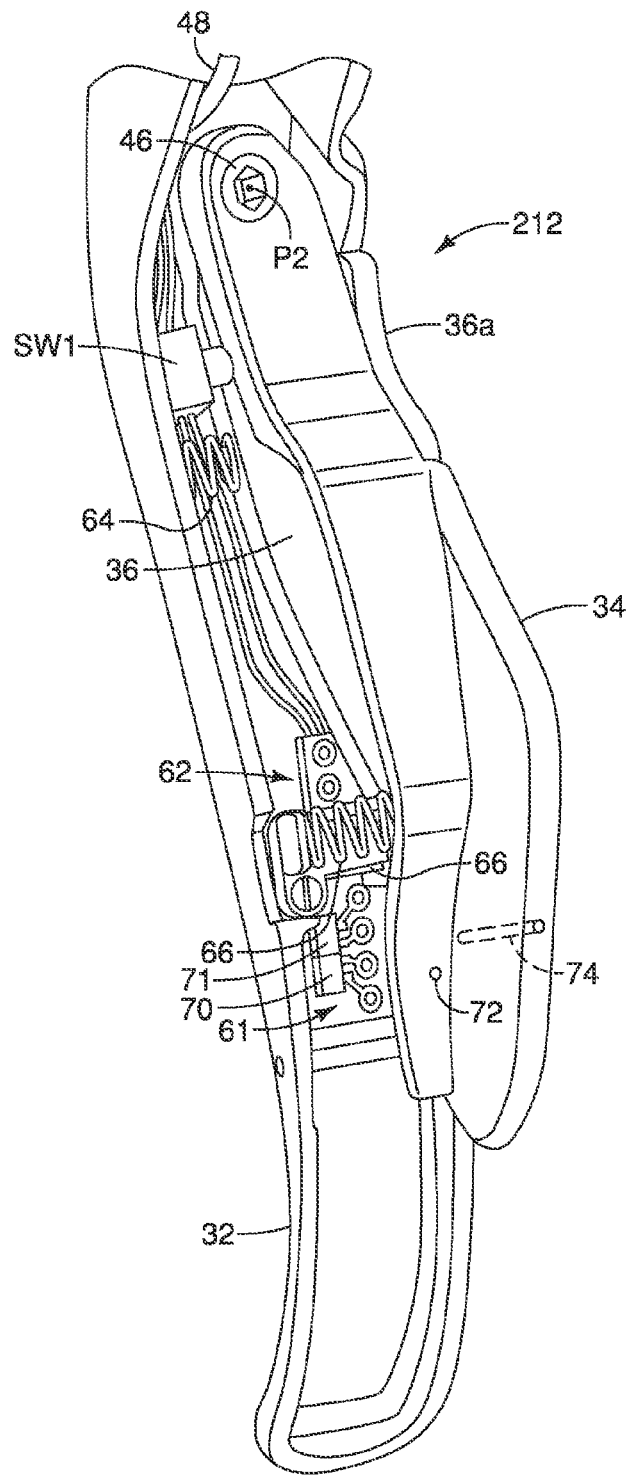
FIG. 21 is an enlarged, partial rear perspective view of a brake lever having first and second operating members mounted a rear side of the brake lever and further having two detecting members and a single switching member mounted to the brake lever in accordance with another embodiment.

Referring now to FIG. 21, a portion of a bicycle control device 212 will now be discussed in accordance with a third embodiment. Basically, the bicycle control device 212 is identical to the bicycle control device 12, discussed above, except that (1) the second switching member SW2 has been removed, (2) an abutment 36a has been added to the second operating member 36, and (3) the first and second detecting members 61 and 62 both have their power lines V passing through the first switching member SW1. In view of the similarity between the first and third embodiments, the parts of the third embodiment that are basically identical to the parts of the first embodiment will be given the same reference numerals as the parts of the first embodiment. Moreover, the descriptions of the parts of the third embodiment that are identical to the parts of the first embodiment may be omitted for the sake of brevity.

Thus, in this third embodiment, the switching member SW1 is used for simultaneously switching both of the first and second detecting members 61 and 62 from the power-off state to the power-on state. In particular, the switching member SW1 is mounted to the rear side of the brake lever 32 at a position along the operating path of the first operating member 34. By adding the abutment 36a to the second operating member 36, the abutment 36a will contact the first operating member 34 so that the first and second operating members 34 and 36 will move together with respect to the base member 28 and the brake lever 32 as the second operating member 36 is operated. In this way, the switching member SW1 will be depressed by the first operating member 34 as the second operating member 36 is operated.

However, like the first embodiment, the second operating member 36 remains stationary as the first operating member 34 is moved with respect to the base member 28 and the brake lever 32. In other words, in this third embodiment, when the first operating member 34 is operated, only the first operating member 34 pivots with respect to the base member 28 and the brake lever 32. In this way, the switching member SW1 will be depressed by the first operating member 34 as the first operating member 34 is operated.

Thus, as the first operating member 34 is operated from the rest position against the biasing force of the first return spring 64 to the switching position (i.e., pivoted by the amount A1) as seen in FIG. 6, the plunger of the switching member SW1 is depressed by the first operating member 34 to supply power to both of the first and second detecting members 61 and 62. Likewise, as the second operating member 36 is operated from the rest position against the biasing force of the second return spring 66 to the same switching position (i.e., pivoted by the amount A1), the plunger of the switching member SW1 is again depressed by the first operating member 34 to supply power to both of the first and second detecting members 61 and 62. Thus, in this third embodiment, the switching position will be the same for both the first and second operating members 34 and 36.

In view of the similarities of the first and third embodiments, reference will be made to FIGS. 7 and 11 to explain why operation of the second operating member 36, which causes the first operating member 34 to move therewith, only results in the signals from the second detecting member 62 being acted upon to perform shifting operations. As seen in FIGS. 7 and 11, the first operating member 34 is pivoted by the amount A2 to reach the first detecting position (FIG. 7), while the second operating member 36 is pivoted by the amount B2 to reach the first detecting position (FIG. 11). Here, the amount A2 is greater than the amount B2. In this way, as the second operating member 36 is operated, the magnet 82 on the second operating member 36 will be detected by the magnetic sensor 80 prior to the magnet 72 on the first operating member 34 being detected by the magnetic sensor 70. As a result, the signal controller 50 will know in this third embodiment of FIG. 21 that the second operating member 36 is operated even though the magnetic sensor 70 subsequently detect the magnet 72 on the first operating member 34 if the second operating member 36 is operated by the amount B3 so as to output a second signal. In other words, in this third embodiment of FIG. 21, the signal controller 50 will know to disregard the signals from the first detecting member 61 when a signal is first received from the second detecting member 62.

Alternatively, the switching member SW1 can be arranged in other ways so as to be activated by the operation of both of the first and second operating members 34 and 36. For example, the plunger of the switching member SW1 can be arranged such that the first and second operating members 34 and 36 each directly contacts the plunger of the switching member SW1 as the first and second operating members 34 and 36 are individually moved.

As in the first and second embodiments, for this third embodiment, the first signal can be one of an upshift signal to perform an upshift movement of a shifting device and a downshift signal to perform a downshift movement of a shifting device. Also the second signal can be the one of the upshift signal and downshift signal. Alternatively, for this third embodiment, the first signal can be one of the upshift and downshift signals and the second signal can be the other of the upshift and downshift signals.

In the second embodiment, explained above, the constructions that the force the first and second force sensors 161 and 162 output the first and second signals in accordance with the operation of the first and second operating members 34 and 36 respectively are explained. However, the number of signals is not limited to the second embodiments as explained above. Rather, a bicycle control device can be constructed in which the force sensor outputs more than two signals can be achieved from the present invention. Further, although the constructions of the first and second force sensors 161 and 162 are explained above in the second embodiment as detecting a compressive force, the present invention is not limited to such constructions. For example, a bicycle control device can be constructed within the scope of the present invention which uses one or more force sensors that detect a tensioning force (pulling force). In this construction, the force sensor(s) is provided on the operating member and the biasing element connects the force sensor and the brake lever together.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also it will be understood that although the terms "first" and "second" may be used herein to describe various components these components should not be limited by these terms. These terms "first" and "second" are only used to distinguish one component from another. Thus, for example, a first component discussed above could be termed a second component and vice-a-versa without departing from the teachings of the present invention. Finally, terms of degree such as "substantially", "about" and "approximately" as used herein mean an amount of deviation of the modified term such that the end result is not significantly changed, e.g., manufacturing tolerances.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
 a base member;
 an operating member movably mounted relative to the base member along an operating path;
 a detecting member being configured to detect movement of the operating member; and
 a switching member electrically connected to the detecting member, the switching member being operated to switch the detecting member from a power-off state to a power-on state in response to movement of the operating member along the operating path.

2. A bicycle control device comprising:
 a base member;
 an operating member movably mounted relative to the base member along an operating path;

a detecting member detecting operation of the operating member; and a switching member electrically connected to the detecting member so that the detecting member is switched from a power-off state to a power-on state in response to operation of the operating member, the switching member being arranged on the operating path and being operated by physical contact by movement of the operating member.

3. The bicycle control device according to claim 2, wherein the switching member is a contact switch which outputs a power-on signal as the switching member is pushed by the physical contact.

4. The bicycle control device according to claim 3, wherein the contact switch continuously outputs the power-on signal while the contact switch is pushed by the physical contact, the detecting member is switched from the power-off state to the power-on state while the contact switch outputs the power-on signal.

5. The bicycle control device according to claim 2, wherein the switching member switches the detecting member from the power-off state to the power-on state as the operating member reaches a switching position from a rest position along the operating path.

6. The bicycle control device according to claim 5, wherein the detecting member non-physically detects position of the operating member to confirm whether the operating member reaches a first detecting position located further from the rest position than the switching position.

7. The bicycle control device according to claim 6, wherein the detecting member outputs a first signal as the operating member reaches the first detecting position.

8. The bicycle control device according to claim 7, wherein the detecting member outputs a second signal as the operation member reaches a second detecting position located further from the rest position than the first detecting position.

9. The bicycle control device according to claim 8, wherein the detecting member outputs the first signal as one of an upshift signal to perform an upshift movement in a shifting device and a downshift signal to perform a downshift movement in the shifting device, and the detecting member outputs the second shift signal as the one of the upshift signal and the downshift signal.

10. The bicycle control device according to claim 8, wherein the detecting member outputs the first signal as one of an upshift signal to perform an upshift movement in a shifting device and a downshift signal to perform a downshift movement in the shifting device, and the detecting member outputs the second shift signal as the other of the upshift signal and the downshift signal.

11. The bicycle control device according to claim 8, wherein the detecting member includes a first unit generating the first signal, and a second unit generating the second signal.

12. The bicycle control device according to claim 11, wherein the first unit includes a first magnetic sensor and the second unit includes a second magnetic sensor.

13. A bicycle control device comprising:
a base member;
an operating member movably mounted relative to the base member along an operating path;
a detecting member detecting operation of the operating member, the detecting member including a force sensor being configured to output at least one control signal based upon an operation force of the operating member acting on the force sensor; and
a switching member electrically connected to the detecting member so that the detecting member is switched from a power-off state to a power-on state in response to operation of the operating member.

14. The bicycle control device according to claim 1, further comprising
a brake lever pivotally connected relative to the base member about a brake operating axis along a brake operating plane to perform a braking operation.

15. The bicycle control device according to claim 14, wherein
the operating member is movably mounted on the brake lever.

16. The bicycle control device according to claim 15, wherein
the operating member is pivotally mounted on the brake lever.

17. The bicycle control device according to claim 1, further comprising
an additional operating member movably mounted relative to the base member along an additional operating path;
an additional detecting member detecting operation of the additional operating member; and
an additional switching member electrically connected to the additional detecting member so that the additional detecting member is switched from a power-off state to a power-on state in response to operation of the additional operating member.

18. The bicycle control device according to claim 1, further comprising
an additional operating member movably mounted relative to the base member along an additional operating path; and
an additional detecting member detecting operation of the additional operating member,
the switching member being electrically connected to the additional detecting member so that the additional detecting member is switched from a power-off state to a power-on state in response to operation of the additional operating member.

* * * * *